C. A. CROWELL.
TYPE WRITER.
APPLICATION FILED MAY 18, 1910.

1,001,359.

Patented Aug. 22, 1911.
6 SHEETS—SHEET 1.

Fig. 1.

Witnesses
J. S. Freeman.

Inventor
C. A. Crowell,
By C. L. Parker, Attorney

C. A. CROWELL.
TYPE WRITER.
APPLICATION FILED MAY 18, 1910.

1,001,359.

Patented Aug. 22, 1911.

UNITED STATES PATENT OFFICE.

CHARLES A. CROWELL, OF STAUNTON, VIRGINIA.

TYPE-WRITER.

1,001,359. Specification of Letters Patent. Patented Aug. 22, 1911.

Application filed May 18, 1910. Serial No. 561,965.

*To all whom it may concern:*

Be it known that I, CHARLES A. CROWELL, a citizen of the United States, residing at Staunton, in the county of Augusta and State of Virginia, have invented certain new and useful Improvements in Type-Writers, of which the following is a specification.

This invention relates to a typewriter provided with means for writing music and in the embodiment of the invention shown and described has particular reference to certain novel mechanism by means of which any typewriter of the usual or standard type may be converted into a machine for writing music, without imparing its efficiency for writing words and figures.

An important object of this invention is to provide simple and reliable means for actuating the platen so that the same may be quickly and easily rotated in either direction, whereby a note or other musical symbol may be printed in a desired position upon a staff.

Another object of this invention is to provide means for printing a staff upon paper preparatory to writing the music.

A further object of this invention is to provide novel means for holding the paper on the platen, to prevent the same slipping or being displaced.

A still further object of this invention is to provide a combined typewriter and music printing machine, so constructed that the same may be employed as an ordinary typewriter or as a combined machine.

Other objects and advantages of my invention will be apparent from the following specification.

My invention consists generally in the combination and arrangement of parts hereinafter described and particularly defined in the appended claims.

In the accompanying drawings, forming a part of this specification, and in which like numerals are employed to designate like parts throughout the same, Fig. 4× is a detail sectional view taken on line 4—4 of Fig. 4. Fig. 17ª is a fragmentary view of the ratchet-wheel shown in Fig. 17.

In the drawings wherein is illustrated a preferred embodiment of my invention, the numeral 1 designates a carriage of the Underwood typewriter. This carriage comprises transverse end strips 2 and 3 which are connected at their forward ends by a strip 4. This strip 4 is provided centrally thereof with a pointer 5 adapted to travel along a scale 6. A sheet metal casing 7 connects the rear ends of the strips 2 and 3 and serves to guide the paper under a platen 8, as is well known in typewriting machines. The carriage 1 is mounted upon a body frame 9, in accordance with the practice employed in the Underwood typewriter. The carriage 1 is moved longitudinally of the body frame 9 by any common or preferred form of escapement mechanism, the same being omitted from the drawings since it does not form a portion of my invention.

Figure 5:
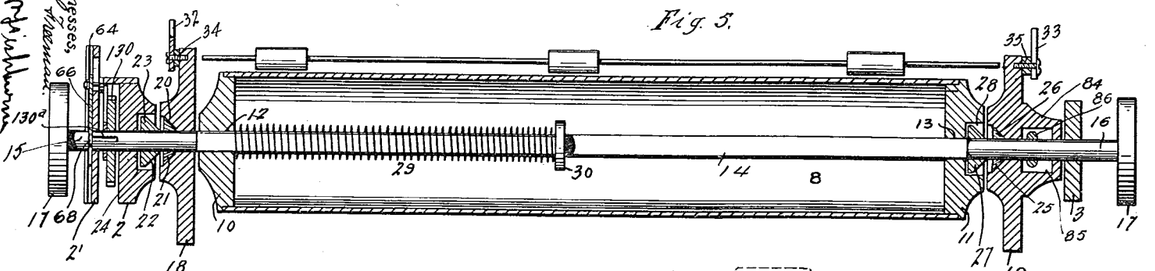
Fig. 5 is a longitudinal vertical section through the platen shown in Fig. 4.
Figure 6:
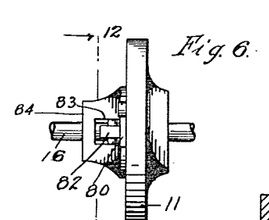
Fig. 6 is a top plan view of the wheel arranged adjacent the right hand end of the plate.
Figure 7:
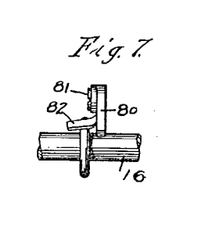
Fig. 7 is an enlarged fragmentary view of the platen shaft, showing a flange designed to actuate the means which I preferably employ for preventing the paper from slipping upon the platen.

The cylindrical platen 8, is formed hollow as shown in Fig. 5, and is provided with end pieces or heads 10 and 11, rigidly secured to the same by any suitable means. The heads 10 and 11 are provided with corresponding openings 12 and 13, which are square in cross section and adapted to receive a platen shaft 14. This platen shaft is formed square in cross section for the greater portion of its length and is provided with slightly reduced cylindrical ends 15 and 16. These cylindrical ends are provided with wheels 17, which are fixedly mounted thereon. The cylindrical ends 15 and 16 of the shaft 14 are loosely mounted in suitable openings formed through the transverse end pieces 2 and 3 respectively of the carriage 1. Loosely mounted upon the cylindrical ends 15 and 16 respectively, are wheels 18 and 19 disposed adjacent the heads 10 and 11. The wheel 18 is provided centrally thereof with a frusto-conical recess 20 provided with teeth 21, to coöperate with the teeth 22 formed upon a clutch head 23 which is fixedly mounted upon the cylindrical end 15 near the transverse end strip 2. The opening 20 provided with teeth 21, together with the clutch head 23 form a clutch device to lock the wheel 18 upon the cylindrical end 15, against rotation. The end strip 2 is provided with a suitable opening 24 to receive the clutch head 23, when the same is out of engagement with the wheel 18. It is to be noted that the wheel 18 is provided upon its outer side with the opening 20 and the wheel 19 provided with a corresponding opening 25 formed upon its inner side. This opening 25 is provided with teeth 26 to coöperate with teeth formed upon a clutch head 27, which is the same in construction as the clutch head 23. The clutch head 27 and the opening 26 thus coöperate to form a clutch device to lock wheel 19 upon the cylindrical end 16. The head 11 is provided centrally thereof with an opening 28 to receive the clutch head 27, when the same is moved out of engagement with the wheel 19. From the above described construction it will be readily understood that if the platen shaft 14 be moved longitudinally to the right, the clutch heads 23 and 27 will be moved into the openings 20 and 25 and both of the wheels 18 and 19 simultaneously locked to the cylindrical ends 15 and 16 respectively. Means is provided to effect this longitudinal movement of the shaft 14, comprising an expansible coil spring 29, which is compressed between the head 10 and a ring 30 fixedly mounted upon the platen shaft 14 near its center, as clearly illustrated in Fig. 5.

Figure 14:
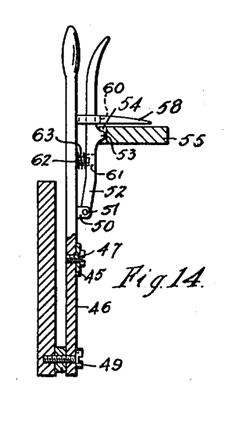
Fig. 14 is an enlarged detail view of the lever employed to move the platen.
Figure 15:
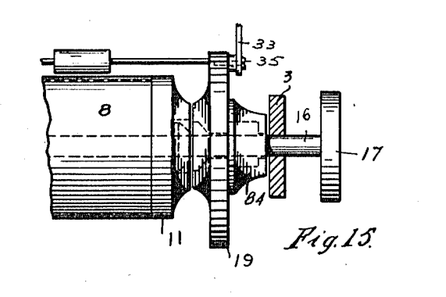
Fig. 15 is a fragmentary side view of the right hand end of the platen and associated members.

When the wheels 18 and 19 are locked against rotation, to the reduced ends 15 and 16 of the platen shaft, they are moved to cause the partial rotation of the platen in either direction, so that the paper upon the platen may be brought to a required position with relation to the point of printing. Adapted to coöperate with the wheels 18 and 19, is a substantially U-shaped bracket 31 having its free ends bent downwardly as shown at 32 and 33, and pivotally connected to the wheels 18 and 19 near their peripheries, as shown at 34 and 35 respectively. A sleeve 36 is slidably and rotatably mounted upon the longitudinally disposed body portion of the bracket 31, and an upstanding arm 37 having a bent upper portion 38, is provided with spaced ears 39, which are fixedly secured to the sleeve 36 by any suitable means. The arm 37 is fixedly mounted upon a rock shaft 39' as shown at 40, and this rock shaft is provided with reduced cylindrical ends 41, which are journaled within suitable openings formed through frame 9. The rock shaft 39' is disposed in a horizontal position whereby the upstanding arm 37 is capable of being swung in a vertical plane and the U-shaped bracket 31 accordingly moved in a horizontal plane to rotate the platen 8 in a direction depending upon the direction of movement of the shaft 39'. The shaft 39' is provided near its left end with a depending lever 43, which is rigidly secured thereto by any suitable means. This lever is pivotally connected at its free end, as shown at 44, to one end of a rod 45, having its opposite end pivotally connected to an indicator lever 46 as shown at 47. The indicator lever is arranged to occupy a position near the typewriting keys. This lever 46 has its lower end pivotally connected to the left hand side of the key board frame 48, as shown at 49. The indicator lever 46 (see Fig. 14) is provided centrally thereof with a projection 50, to which is pivoted as shown at 51, an arm 52, which in turn is provided near its center with an inwardly extending tongue 53. This tongue is preferably triangular in horizontal cross-section and is adapted to coöperate with teeth 54 formed upon the outer edge of a plate 55. By reference to Fig. 16 it will be seen that the plate 55 is disposed at the left of the keys, and the plate may preferably be provided with arms 56 to connect the same to the side 48 of the key board frame, whereby said strip is supported. The plate 55 is formed curved and provided upon its upper surface with a scale designated as a whole by the numeral 57. The indicator lever 46 is provided near its upper end with a pointer 58 to travel along the scale 57. This pointer is provided near the lever 46 with an axial slot 60 within which is disposed the arm 52. The arm 52 is provided below the strips 55 with an opening 61 to receive a pin 62 which is fixedly secured to the indicator lever 46. An expansible coil spring 63 surrounds the pin 62 and is compressed between the lever 46 and arm 52 to normally hold the tongue 53 into engagement with the teeth 54.

Figure 10:
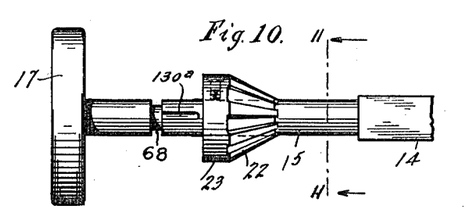
Fig. 10 is an enlarged detail view of the left end of the platen shaft.
Figure 11:
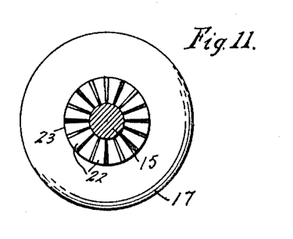
Fig. 11 is a cross-sectional view taken on the line 11—11 of Fig. 10 and looking in the direction of the arrows.
Figure 12:
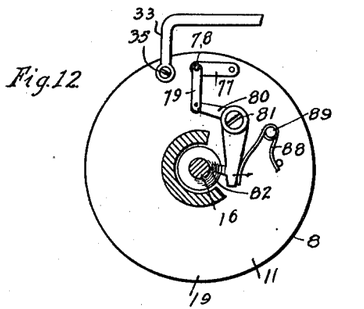
Fig. 12 is a vertical cross-sectional view taken on line 12—12 of Fig. 6, and looking in the direction of the arrows.
Figure 13:
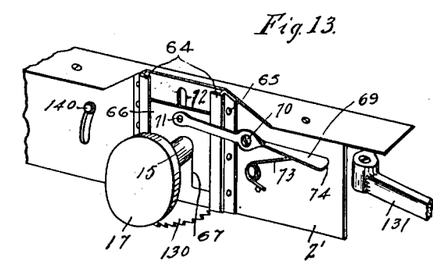
Fig. 13 is a side view of the mechanism employed to lock the platen shaft in a desired position, the same being arranged upon the left hand end of the carriage.

The transverse end strip 2 is provided with an apron 2', near the ends of which are secured outwardly extending spaced brackets 64, which are secured to the same by any suitable means, as shown at 65 Slidably mounted between the brackets 64 is a member 66, which is provided with a vertically disposed slot 67 adapted to contain the cylindrical end 15 of the shaft 14. The cylindrical end 15, is provided with a peripheral groove 68, as clearly shown in Fig. 10, adapted to receive the walls of the slot 67. When the member 66 is in its lowermost position, as shown in Fig. 13, the walls of the slot 67 are disposed within the groove 68, whereby the platen shaft 14 is locked in a position illustrated in Fig. 5. A lever 69 is pivotally mounted as at 70 upon the apron 2', and has its inner end pivoted by means of a pin or screw 71 to the member 66. The pin 71 extends inwardly to be disposed within a vertical slot 72. The lever 69 is normally retained in a horizontal position by means of a spring 73, as clearly shown in Fig. 13. From the above construction it is obvious that if the forward end 74 of the lever 69 is forced downwardly, the member 66 will be elevated until the pin 71 strikes the upper end wall of the slot 72. The shaft 14 is then released and the same is moved longitudinally to the right, by the spring 29, whereby the wheels 18 and 19 are locked to the cylindrical ends 15 and 16 as above described. When the platen shaft 14 is moved longitudinally to the left, the walls of the slot 67 will again fit within the groove 68, whereby the platen shaft is again locked.

Figure 1:
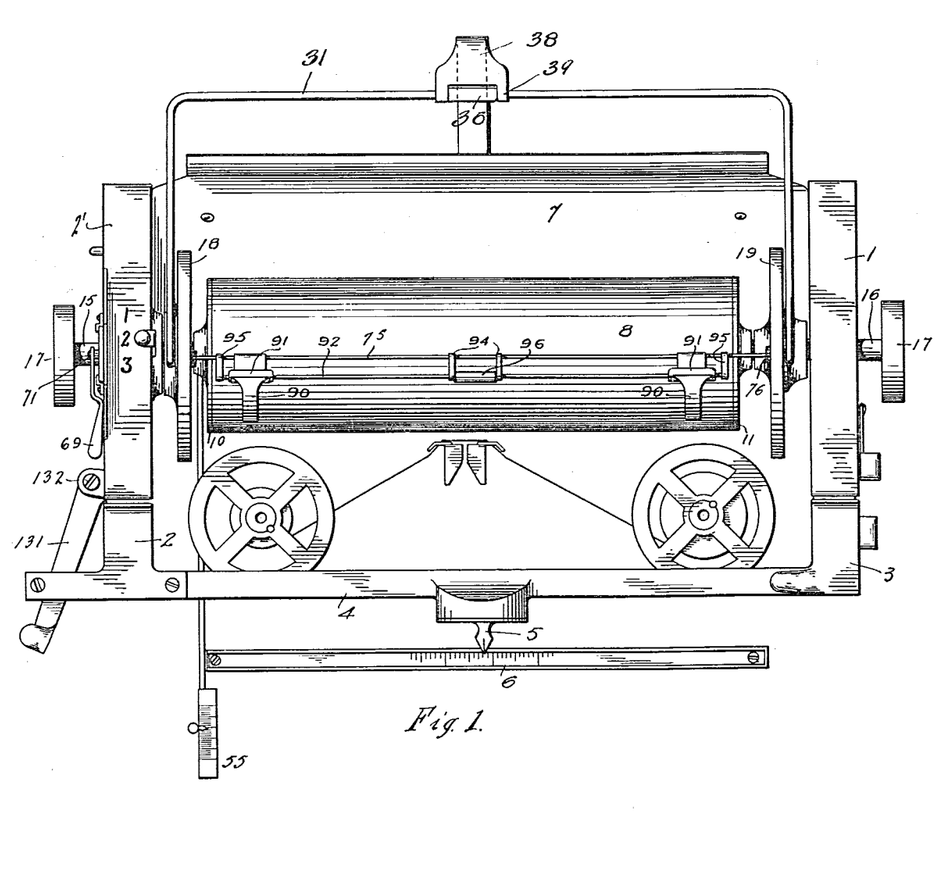
Figure 1 is a top plan view of the carriage of the Underwood typewriter, showing my improvements combined therewith.

A very important feature of my invention consists in the provision of automatic means for clamping the paper to the platen 8, when the platen shaft 14 is moved longitudinally to the right to lock the wheels 18 and 19 to the cylindrical ends 15 and 16 respectively, as above stated. Such means comprise a rock shaft 75, journaled in openings formed through the wheels 18 and 19. The shaft is provided near its end and inwardly of the wheels 18 and 19 with collars 76, to prevent the longitudinal movement of said shaft but not interfering with its rocking movement. The right end of the shaft 75 extends outwardly beyond the wheel 19 and carries a crank 77 fixedly secured thereto. This crank is pivoted as shown at 78 to a link 79, which in turn is pivotally connected to a bell crank lever 80, which in turn is pivotally connected to the wheel 19 as shown at 81. The vertical arm of this bell crank lever is provided with an angularly disposed projection 82, extending through a suitable opening 83 formed through a hub portion 84 of the wheel 19. The hub portion 84 is further provided with an enlarged opening 85 into which the opening 83 leads. An annular flange 86 is fixedly mounted upon the cylindrical end 16 and disposed within the opening 85. When the platen shaft 14 is moved to the right by the spring 29 as above described, the flange 86 engages the projection 82 and forces the vertical arm of the bell crank lever 80 in a direction indicated by the arrow. This movement of the bell crank lever is imparted to the crank 77 and the shaft 75 will accordingly be rocked forwardly in the direction indicated by the arrow 87. When the shaft 14 is moved to the left and locked by the member 66, as above described, the flange 86 is moved out of engagement with the angularly disposed extension 82, and the bell crank lever 80 is returned to its normal position by means of a spring 88 secured to the wheel 19 as shown at 89. The shaft 75 is provided near its ends with strips of metal 90 rigidly mounted upon the same. These strips 90 extend through the U-shaped brackets 91, which are secured to a shaft 92 disposed near and in parallel relation to the shaft 75. The U-shaped brackets 91 straddle rollers 93 carried by the shaft 92. The shaft 92 terminates at points inwardly of the ends of the platen 8, as clearly shown in Fig. 1, and this shaft is rigidly connected to the shaft 75 by the strips 94 and 95, arranged near the center and ends respectively of the shaft 75. The shaft 92 carries a roller 96, which is disposed between the strips 94. It is obvious that when the shaft 75 is rocked forwardly in the direction of its arrow, the shaft 92 and strips 90 will be oscillated downwardly so that the rollers 93 and 96 and said strips 90 will engage the paper to firmly hold the same against the platen 8. When the shaft 75 is rocked in a reverse direction, the strips 90 will be oscillated upwardly to release the paper, so that the same may be removed.

Figure 2:
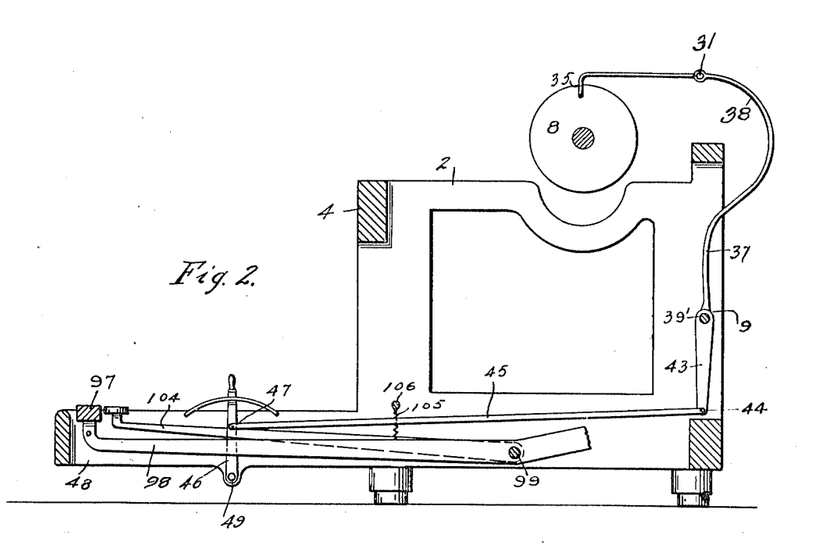
Fig. 2 is a vertical cross-sectional view through an Underwood typewriter equipped with my improvement, parts being omitted for the sake of clearness, and showing the arrangement of the means which I employ for actuating the platen.
Figure 3:
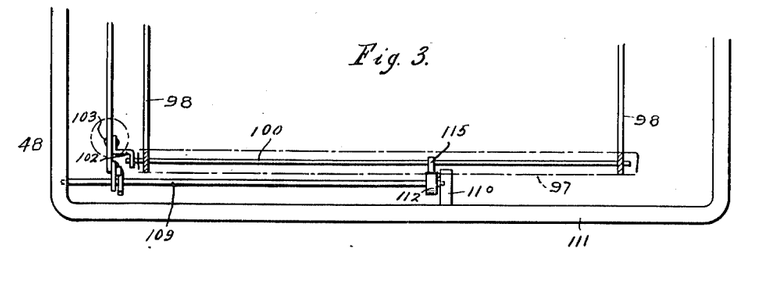
Fig. 3 is a top plan view of the space bar, showing means for holding the same in its lowermost position.
Figure 4:
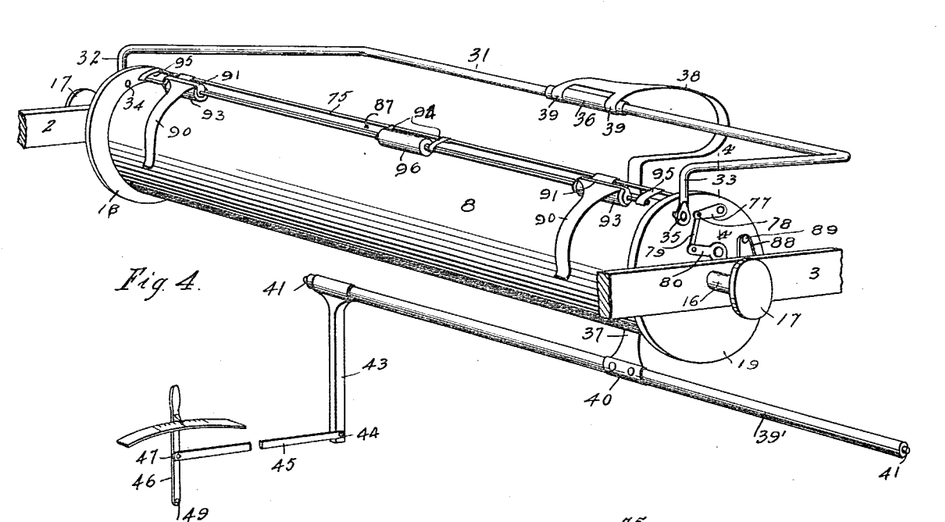
Fig. 4 is a perspective view of the platen removed, showing the means for shifting the same, together with other associated members.
Figure 4A:
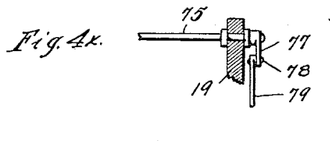
Figure 8:
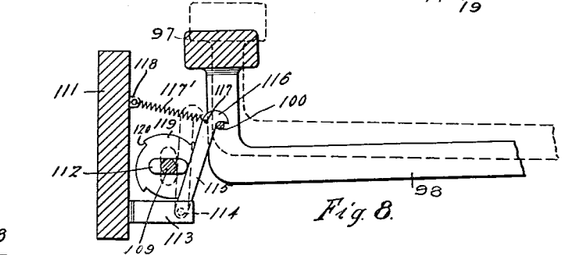
Fig. 8 is a cross-sectional view of the space bar and showing in side elevation a latch to hold the same in its lowermost position.
Figure 9:
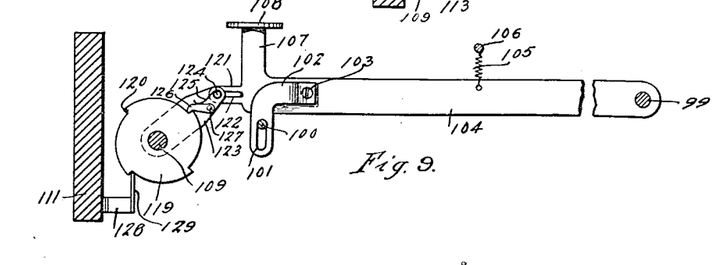
Fig. 9 is a side view of the means employed to operate the latch shown in Fig. 8.
Figure 16:
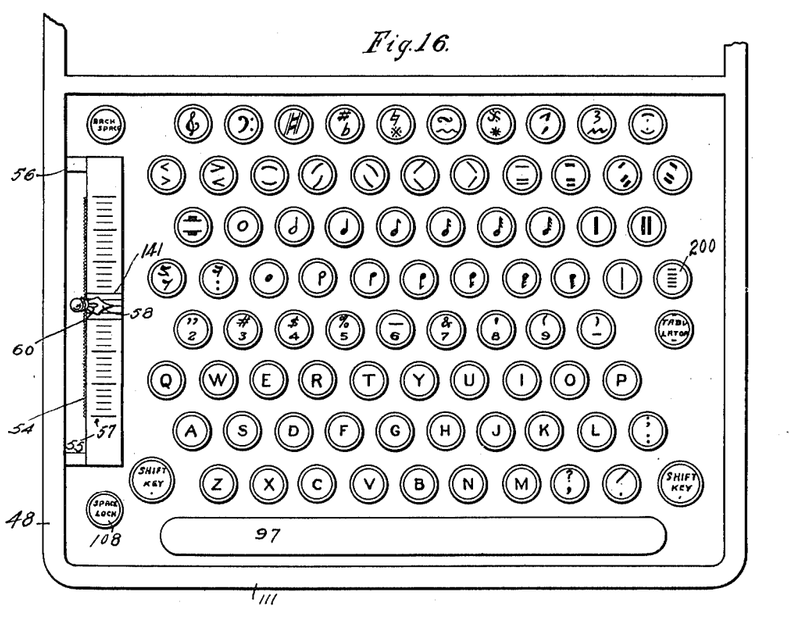
Fig. 16 is a top plan view of the key board of my machine.

In the printing of music it is very often necessary to print two or more notes in a vertical row, as in the printing of a chord composed of notes which are to be played at the same time. In the operation of the Underwood typewriter and other machines of this character, by holding the space-bar in its lowermost position, a plurality of characters may be printed in a vertical row, it being understood that the platen is properly rotated. I therefore, propose to take advantage of this fact and provide means for retaining the space bar in its lowermost position, so that the operator may use both hands. I will now proceed to describe the means for holding the space bar in its lowermost position. Special attention is now called to Figs. 2, 8 and 9, wherein the numeral 97 designates a space bar, which is connected at its ends to levers 98, fixedly mounted upon a rock shaft 99. This rock shaft is journaled through the lower portion of the main frame 9, as shown in Fig. 2. The rock shaft 99 is connected, in the Underwood typewriter, to the escapement mechanism (not shown) whereby the carriage 1 is made to travel longitudinally of the main frame 9, when the space bar 97 is depressed and released. The levers 98 are further connected by a rod 100 which is disposed below the space-bar 97. This rod extends beyond the left hand lever 98 and is arranged within a vertically disposed elongated slot 101 formed through an L-shaped bracket 102, fixedly connected as shown at 103 to a lever 104. The inner end of lever 104 is pivotally mounted upon the rock shaft 99, and this lever is normally held in its elevated position by means of a retractile coil spring 105, which is connected to the same as shown in Fig. 9 and to a transverse rod 106. Lever 104 is provided adjacent the bracket 101 with an upstanding portion 107, upon which is mounted a key 108. In Fig. 16 this key is shown as being arranged forwardly of the scale plate 55, and is marked "space lock." A shaft 109 has its left end journaled in an opening formed in the left hand side of the key board frame 48 and in a suitable opening formed in an inwardly extending strip 110 fixedly secured to the section 111. The shaft 109 is capable of being rotated and is provided near the strip 110 with a double ended cam 112, which is fixedly mounted upon the same. Near and below the strip 110 is a second inwardly extending strip 113, to which is pivotally connected as shown at 114, a hook latch 115 having an upper hooked end 116 adapted to engage the rod 100. A retractile coil spring 117′ is connected as shown at 117, to the hook latch 115 and is also connected as shown at 118, to the section 111. The object of the coil spring is to retain the hook latch 115 in a normal vertical position as shown by the dotted lines, and the cam 112 is then disposed in a vertical position, as shown by the dotted lines. From the above described construction it is obvious that the cam 112 is disposed to engage the hook latch 115 and that said cam may be rotated one-fourth of a revolution to urge the hook latch 115 to its inclined position and when rotated another fourth of a revolution to allow said hook latch to return to its vertical position. The shaft 109 is provided near the bracket 101 with a ratchet wheel 119, which is fixedly secured to the same and provided with ratchet teeth 120, each of which is one-fourth of the circumference of the wheel in length. The lever 104 is provided near the upstanding portion 107 with an extension 121, which in turn is provided with an elongated slot 122. A link 123 is pivotally mounted upon the shaft 109 and is provided at its upper end with a pin 124 fixedly secured to the same and extending laterally beyond the same on both sides. The pin 124 has one of its ends disposed within the slot 122, and its opposite end carries a spring 125, which engages a dog 126 having pivotal connection with the link 123 as shown at 127. The dog 126 is adapted to engage successively the teeth 120 of the ratchet wheel 119 to rotate said ratchet wheel together with the shaft 109, one-fourth of a revolution every time the lever 104 is depressed.

The section 111 is provided with a bracket 128 upon which is mounted a spring catch 129, adapted to engage the ratchet wheel 119 to prevent the rotation of the same in a reverse direction. From the above description it is obvious that when the lever 104 is depressed, the rod 100 is forced downwardly to bring the space-bar 97 to its lowermost position. The link 123 is then oscillated downwardly and the dog 126 carries with it and rotates the ratchet-wheel 119 one-fourth of a revolution. The cam 112 has now been moved from its vertical to a horizontal position whereby the hook latch 115 is forced inwardly and engages the rod 100 to lock said space-bar in its lowermost position. Owing to the slot 101 it is obvious that rod 100 will be allowed to move in the same when the space-bar is pressed downwardly by the operator, during the ordinary typewriting, without causing the lever 104 to be depressed.

Figure 17:
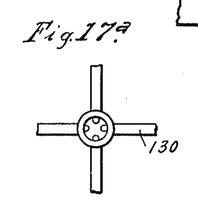
Fig. 17 is a side view of the mechanism employed upon the Underwood typewriter to control the rotation of the platen.

The cylindrical end 15 is provided with a ratchet-wheel 130, the hub of which is provided with teeth adapted to be arranged within axially disposed slots 130ª, whereby said ratchet-wheel is splined upon said end 15. This ratchet-wheel is to be rotated by mechanism mounted upon the left end of the carriage 1. This mechanism may be of the form employed upon the Underwood typewriter and comprises a lever 131, pivotally connected to the end strip 2 as shown at 132. This lever constitutes a portion of the said mechanism and when said lever is oscillated to the right the platen 8 is partially rotated. This lever 131 is also employed to return the carriage 1 to its starting position after the same has reached the end of its escapement movement. In Fig. 17 is illustrated means employed in the Underwood typewriter and at the left hand of the carriage to engage the ratchet-wheel 130, to prevent the free rotation of the platen 8. Such means comprises a swinging lever 133, provided at its free end with a roller 134 and pivotally connected to the transverse end 2 of the carriage 1 as shown at 135. A spring 136 is employed to urge the lever 133 so that the roller 134 will engage the teeth of the ratchet wheel 130. A member 137 is pivotally mounted upon the cylindrical end 15 and is provided with a cam surface 138 to engage a pin 139, which is fixedly mounted upon the lever 133. The member 137 is also provided with a handle 140 so that said member may be oscillated from the horizontal position as shown in Fig. 17 to assume an inclined position whereby the roller 134 may engage the ratchet wheel 130 as above stated. When the indicator lever 46 is being used to shift the platen 8, the member 137 is elevated to its horizontal position, to release the ratchet wheel 130, whereby the platen may be more easily operated.

Figure 18:
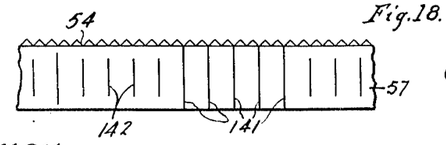
Fig. 18 is an enlarged fragmentary view of the scale plate.

By reference to Fig. 18, it will be seen that the scale 57 is provided centrally thereof with five lines 141 which represent the five lines in a musical staff. It is also to be noted that there are two teeth 54 between two of the lines 141. By this arrangement the pointer 59 may be arranged on or between the lines 141, so that the platen may be properly rotated when it is desired to print a note upon a line or between or above or below the lines of the musical staff. The lines 142 above and below the staff lines 141 designate leger lines upon which it is desired to print notes. There are two teeth between two of the lines 142 whereby the platen may be rotated by the lever 46 a desired distance, to print a note upon a leger line or between the same, above or below the musical staff, as the case may be.

In Fig. 16 I have illustrated a form of key board adapted to be employed in connection with my machine. I have simply illustrated the keys and have omitted the levers and type connected to the same, as these levers may be of any well known form, such as are employed in the Underwood typewriter. The distinguishing feature between this key board and that of the Underwood typewriter key board is that an additional set of keys are employed to furnish the musical symbols and notes necessary to print music. This key board also is provided with the scale 57 above described and the space lock key 108.

The operation of the machine is as follows:—The paper is placed about the platen in the usual manner, its upper end being disposed below the strips or clamps 90. The end 74 of the lever 69 is depressed whereby the member 66 will be elevated and the shaft 14 moved longitudinally to the right to lock the wheels 18 and 19 to the cylindrical ends 15 and 16 respectively. This longitudinal movement of the shaft 14 actuates the bell crank lever 80 to draw the link 79 downwardly and rock the shaft 75, whereby the strips 90 engage the paper to press the same against the platen 8. It is thus seen that the means employed to hold the paper against the platen is automatic in its action. When starting to print music, the indicator lever 46 is arranged in its neutral position, that is, in a position so that the pointer carried by said lever will be disposed upon the center line 141 of the staff lines, as indicated in Fig. 16. It is to be understood that the paper is to be provided with the musical staff printed thereon, by key 100 and the paper is to be so disposed upon the platen that a note may be printed upon the center staff line 141. If the indicator lever is oscillated forwardly or rearwardly as may be desired, the platen will be properly rotated so that a note may be printed in a desired position upon the staff, corresponding to the position occupied by the pointer upon the staff scale. When it is desired to print a plurality of notes in a vertical row, the space lock key 108 is depressed, whereby the space-bar 97 is forced into its lowermost position and locked in such position, as above described. It is to be understood that the means employed to lock the space-bar in its lowermost position is independent of the means to rotate the platen and does not interfere with the operation of the latter. The key 108 is returned to its raised position by the spring 105, and when said key is again depressed, the space bar will be released and return to its normal position, by the ordinary means employed upon the Underwood typewriter. Special attention is called to the fact that when the means to rotate the platen is in operation, together with the means to hold the paper against the platen, the ordinary typewriter keys may be operated to write the words of a song in connection with the music being printed. When the shaft 14 is moved to the left and locked by the member 66, the machine may be employed as an ordinary typewriter.

While I have illustrated my invention in combination with an Underwood typewriter or the main portion thereof, it is to be understood that the invention may be combined with any other typewriter of usual or standard construction and that by certain alterations or supplemental features my improvement may be adapted to typewriters other than those of usual or standard types.

It is to be further understood that the form of my invention herewith shown and described is to be taken as a preferred example of the same, and that various changes in the size, shape and arrangement of parts may be resorted to without departing from the spirit of my invention, or the scope of the annexed claims.

Having fully described my invention, I claim:—

1. In a machine of the character described, a carriage, a platen rotatably mounted upon said carriage, means to partially rotate said platen, paper gripping means to coöperate with said platen, and common means to render the first named means operative and inoperative and to actuate the paper gripping means.

2. In a machine of the character described, a carriage, a platen rotatably mounted upon said carriage, means to partially rotate said platen, means to render the first named means operative and inoperative, a movable lever, connecting means between said lever and the first named means, means to coöperate with said lever for indicating the amount of rotary movement of the platen, and means to hold said lever in adjustment at different positions.

3. In a machine of the character described, a carriage, a platen-shaft mounted upon said carriage, a platen mounted upon said platen-shaft wheels mounted upon said platen-shaft, means to lock said wheels to said platen-shaft, means to grip paper against the platen, and said platen-shaft serving as common means upon the longitudinal movement thereof, to actuate the first and second named means.

4. In a machine of the character described, a carriage, a platen-shaft mounted upon said carriage, so that the said platen-shaft may move longitudinally, a platen mounted upon said platen-shaft, wheels mounted upon said platen-shaft near the ends of the platen, means to lock said wheels to the platen-shaft, means to grip paper against the platen, said platen-shaft serving as common means upon the longitudinal movement thereof, to actuate the first and second named means, and means to partially rotate said wheels.

5. The combination with a pivoted platen, of means to partially rotate said platen, paper gripping means to coöperate with said platen, and common means to render the first named means operative and inoperative and to actuate the paper gripping means.

6. In a machine of the character described, a carriage, a platen rotatably mounted upon the same, a bracket to partially rotate said platen, connecting means between the platen and bracket, pivoted means engaging said bracket to effect a movement thereof, means to move the pivoted means, paper gripping means to coöperate with the platen, and means to render the said first named means operative and inoperative and to actuate the paper gripping means.

7. In a machine of the character described, a carriage, a shaft loosely mounted therethrough, a platen mounted upon said shaft, a rock shaft disposed in operative relation to said platen and provided with means to press paper against said platen, means to effect the movement of said rock shaft, and means connected to said first named shaft to actuate the second named means.

8. In a machine of the character described, a carriage a platen shaft loosely mounted through the same, a platen mounted upon said shaft, a rock shaft disposed in operative relation to said platen and provided with means to press paper against said platen, mechanism to effect the movement of the rock shaft, means connected to said platen shaft to actuate said mechanism upon the longitudinal movement of said shaft, and means to cause such longitudinal movement.

9. In a machine of the character described, a carriage, a platen shaft mounted upon the same, a platen mounted upon said shaft, a rock shaft disposed in operative relation to said platen, mechanism including a bell crank lever to move said rock shaft, and means connected to the platen shaft to actuate said bell crank lever.

10. In a machine of the character described, a carriage, a platen shaft mounted upon the same, a platen mounted upon said shaft, a rock shaft disposed in operative relation to said platen, means connected to the rock shaft to press paper against the platen, mechanism to move the rock shaft including a bell crank lever, means mounted upon said platen shaft to actuate the bell crank lever upon the longitudinal movement of the same, and means to cause such longitudinal movement of said platen shaft.

11. In a machine of the character described, a carriage, a platen shaft mounted through the same, a platen mounted upon said platen shaft, wheels loosely mounted upon said shaft to rotate said platen, a rock shaft arranged in operative relation to said platen, means connected to said rock shaft to press paper against the platen, mechanism to cause the movement of said rock shaft including a bell crank lever, and means connected to the platen shaft to lock said wheels to the same, and actuate said bell crank lever.

12. In a machine of the character described, a carriage, a platen shaft mounted through the same, to have longitudinal movement, a platen mounted upon said platen shaft, oscillatory means disposed in operative relation to the platen to press paper against the same, mechanism to move said means including a bell crank lever provided with an angular extension, and said platen shaft being provided with a flange to engage said angular extension upon the longitudinal movement of said platen shaft.

13. In a machine of the character described, a carriage, a platen-shaft mounted upon the same, a platen mounted upon said platen-shaft, wheels mounted upon said platen-shaft near the ends of said platen, means to lock said wheels against rotation to said platen shaft, a movable lever disposed near said platen, and means connecting said movable lever and wheels.

14. In a machine of the character described, a carriage, a platen shaft supported by the same, wheels rotatably mounted upon said platen shaft, means to lock said wheels to said shaft so that the same rotate with the platen, a bracket pivotally connected to said wheels, a swinging arm pivotally connected to said bracket, a rock shaft to which said swinging arm is connected means to actuate said rock shaft including an indicator lever provided with a pointer, and a scale indicating a musical staff to coöperate with said pointer.

15. In a machine of the character described, a carriage, a platen shaft supported by the same, a platen mounted upon said platen shaft, a wheel rotatably mounted upon the platen shaft to operate the platen, means to lock said wheel to the platen shaft, a rock shaft disposed in operative relation to the platen, means connected to the rock shaft to press paper against the platen, a bell crank lever pivotally connected to said wheel to effect the movement of the rock shaft, and means carried by the platen shaft to actuate the bell crank lever.

16. In a machine of the character described, a carriage, a platen shaft supported thereby to move longitudinally, a platen mounted upon said shaft, a wheel loosely mounted upon said shaft, means carried by said shaft to lock said wheel to the same, said shaft being provided with a peripheral groove, a movable member provided with a slot to coöperate with said groove to lock said platen shaft against such longitudinal movement, and means to effect the longitudinal movement of said shaft when the same is released.

17. In a machine of the character described, a carriage, a platen-shaft mounted upon the same, a platen mounted upon said platen-shaft, wheels mounted upon said platen-shaft near the ends of said platen, means to lock said wheels against rotation to said platen-shaft, a movable lever disposed near said platen, means connecting said movable lever and wheels, and means disposed in coöperative relation to the movable lever for denoting the distance that the platen has been partially rotated by said movable lever.

18. In a machine of the character described, a carriage, a platen-shaft mounted upon the same to move longitudinally, a platen mounted upon said platen-shaft to rotate therewith, a wheel rotatably mounted upon said platen-shaft to effect a rotary movement of the platen, means to lock said wheel against rotation to said platen-shaft, means to grip paper against said platen, and a lever disposed near said platen to operate the second named means, said platen-shaft serving as common means upon the longitudinal movement thereof, to actuate the first named means and said lever.

19. In a machine of the character described, a carriage, a platen pivotally mounted upon the same, means to oscillate the platen, including a pivoted lever provided with a pointer, an arm connected with said pivoted lever and carrying a tooth, and a plate disposed in coöperative relation to said pivoted lever, having a scale formed thereon to coöperate with the pointer and a plurality of teeth to coöperate with the first named tooth.

In testimony whereof I affix my signature in presence of two witnesses.

CHARLES A. CROWELL.

Witnesses:
 HENRY F. NORRIS,
 D. EDW. REAMER.